United States Patent
Wirobski et al.

[11] Patent Number: 6,013,687
[45] Date of Patent: Jan. 11, 2000

[54] PRE-EXPANDED POLYOLEFIN FOAM BEADS

[75] Inventors: Reinhard Wirobski, Marl; Michael Traeger; Bernd Guenzel, both of Haltern, all of Germany

[73] Assignee: Huels Aktiengesellschaft, Marl, Germany

[21] Appl. No.: 09/145,610

[22] Filed: Sep. 2, 1998

[30] Foreign Application Priority Data

Sep. 6, 1997 [DE] Germany ............. 197 39 113

[51] Int. Cl.⁷ .......................................... C08J 9/32
[52] U.S. Cl. ................... 521/60; 521/56; 521/58; 521/59; 264/6; 264/126
[58] Field of Search ................. 521/56, 58, 59, 521/60

[56] References Cited

U.S. PATENT DOCUMENTS

| | | | |
|---|---|---|---|
| 4,777,000 | 10/1988 | Kuwabara et al. | 521/60 |
| 5,071,883 | 12/1991 | Kuwabara et al. | 521/60 |
| 5,459,169 | 10/1995 | Tokoro et al. | 521/60 |
| 5,599,830 | 2/1997 | Park et al. | 521/60 |
| 5,703,135 | 12/1997 | Schweinzer et al. | 521/60 |
| 5,716,998 | 2/1998 | Monakata et al. | 521/60 |
| 5,744,505 | 4/1998 | Fischer et al. | 521/60 |
| 5,747,549 | 5/1998 | Tsurugai et al. | 521/60 |
| 5,773,481 | 6/1998 | Fischer et al. | 521/60 |

*Primary Examiner*—Morton Foelak
*Attorney, Agent, or Firm*—Oblon, Spivak, McClelland, Maier & Neustadt, P.C.

[57] ABSTRACT

Polyolefinic foam beads which can be processed over a wide temperature range to give molded articles where a ratio of the areas of low-temperature peak and high-temperature peak in the DSC curve during the first heating has a value of not more than 3, and where the heat of fusion of the secondary crystals is greater than 10 J/g.

18 Claims, 1 Drawing Sheet

PRE-EXPANDED POLYOLEFIN FOAM BEADS

BACKGROUND OF THE INVENTION

1. Field of the Invention

The present invention relates to polyolefin foam beads which can be processed over a wide temperature range to give molded articles.

2. Description of the Related Art

The production of molded articles from polyolefin foams is known. Accordingly, a closed but vented mold is filled with foam beads, which may be loose or under pressure, and these are intimately fused by applying steam.

The shape of the molded articles can vary greatly. In industry, molded articles exhibit very large differences in wall thicknesses. For example, areas of 20 cm thickness contrast with thin fillets or tapered zones having a wall thickness of only a few millimeters.

The application of steam must be sufficiently intensive to bring about complete fusion of the foam beads with one another in the interior of the thick areas. This intensive application of steam causes over stressing of the foam beads in the thin-walled areas as a result of long exposure to excessively high temperatures.

Damage to the foam beads has been observed under these conditions. The base material overblows or begins to melt, and the cell structure is partially or completely destroyed. The foam beads collapse in these areas after the molded articles have been cooled.

If, on the other hand, the application of steam is gentle, there is insufficient fusion in the interior of the thick areas. In addition, the surfaces have interstices and are matt.

There is, furthermore, increasing demand in the market for molded articles having a very smooth surface, extending to compaction of the outer layer of material, the bead structure being no longer recognizable. A marked improvement of this type in the quality of the surface can be achieved if increased steam pressures are used with lengthened steam application time. This, however, generally likewise causes damage to the foam beads.

An object of he present invention is to prepare, from a polyolefinic material, foam beads which can be processed without damage in a wide range of processing conditions.

SUMMARY OF THE INVENTION

Surprisingly, this object can be achieved by using foam beads in which the ratio of the areas of low-temperature peak and high-temperature peak in the Dynamic Scanning Calorimetry (DSC) curve during the first heating has a value of not more than 3, where the heat of fusion of the secondary crystals is greater than 10 J/g. The foam beads are not damaged by more intensive application of steam. It is also observed that the molded articles have the desired smooth and glossy surface to which dust does not adhere.

DESCRIPTION OF THE PREFERRED EMBODYMENTS

Figure 1:
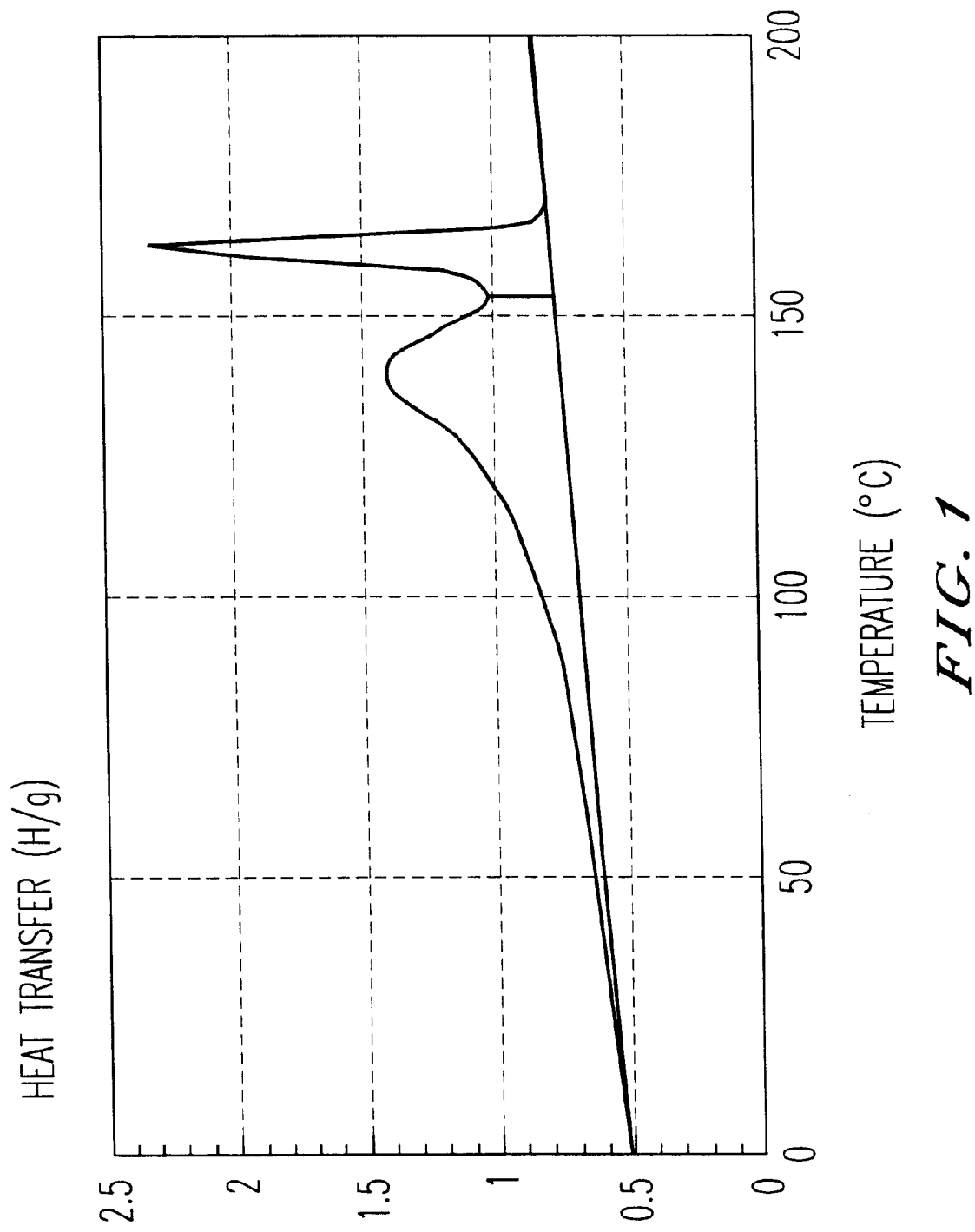
FIG. 1 represents a typical dynamic differential calorimetry curve.

A polyolefin used for the purpose of the invention may be a homo- or a copolymer of a known olefin, in particular of ethene, propene or 1-butene, such as a random copolymer of propene and ethene or of propene and 1-butene, a random terpolymer of ethene, propene and 1-butene, a block copolymer of ethene and propene and a copolymer of ethene and vinyl acetate or of ethene and methyl methacrylate. Preference is given to the use of a random copolymer of ethene and propene having from 1 to 15% by weight of ethene and particularly preferably from 2 to 5% by weight of ethene. The melt flow index according to DIN ISO 1133 at 230° C. is usually in the range of from 1 to 30 g/10 min and preferably in the range of from 5 to 25 g/10 min.

The polyolefin, in accordance with the present invention, may contain an additive, such as a solid foaming aid (as disclosed in EP-A0 095 109); examples of these are carbon black, talc, magnesium hydroxide and dibenzylidenesorbitol. Other possible additives include, but are not limited to, a processing aid, a dye, an antistat, a flame retardant, a stabilizer or another polymer.

From the plastic granules used, it is possible to produce moldable foam by any of the known dispersion foaming methods. The general procedure for this is that a) a dispersion which consists essentially of the plastic granules and a liquid dispersion medium is placed, in the presence of a blowing agent, in a pressure-resistant reactor, b) the mixture is exposed to heat, and then c) the dispersion is released via an orifice into a low-pressure chamber, during which the polymer beads are foamed.

The blowing agent used may be either a volatile organic blowing agent or an inorganic gas, such as nitrogen, air or $CO_2$.

The dispersion may also contain a dispersing agent.

Reference may be made for further details to the European Patent Applications EP-A-0 053 333; 0 095 109; 0 113 903; 0 123,144; 0 168 954; 0 630 935; and 0 646 619.

The foam beads thus obtained are then isolated and dried.

The DSC curve is recorded using dynamic differential calorimetry (DDC) according to DIN 53765 and AN-SAA 0663, for example with a DSC 7 apparatus from Perkin-Elmer. For this, a known amount of specimen is heated from −30° C. to 210° C. at a rate of 20 K/min and the shape of the curve is recorded. The two peaks are divided by a vertical at the minimum of the curve at a right angle to the base line. The areas, or the enthalpies associated with the two peaks, are evaluated and set in a ratio to one another.

In a preferred embodiment, the ratio of the areas of low-temperature peak and high-temperature peak is not more than about 2.7, particularly preferably not more than about 2.5 and very particularly preferably not more than about 2.0.

The ratio of the areas of the low-temperature peak and the high-temperature peak can be influenced by the selection of a suitable impregnation temperature and by the amount of the blowing agent, as shown in the experimental section.

It is also useful preferred that the heat of fusion of the secondary crystals, which is determined by integrating the high-temperature peak, is greater than about 15 J/g, preferably greater than about 20 J/g and particularly preferably greater than about 25 J/g.

In another preferred embodiment, the factor given by the following formula is $\leq 100$:

$$\frac{\text{Area of the low-temperature peak}}{\text{Area of the high-temperature peak}} \times \text{bulk density (g/l)}$$

All stated parts are parts by weight.

Having generally described this invention, a further understanding can be obtained by reference to certain specific examples which are provided herein for purposes of illustration only and are not intended to be limiting unless otherwise specified. Further, the following Examples are also presented in the priority document German patent application 197 39 113.9, filed Sep. 6, 1976, which is incorporated herein by reference.

EXAMPLES

Comparative Examples 1–3

Three typical samples of commercially available polypropylene foam beads are analyzed by DSC; see Table 1. Processing to give molded articles incurred the disadvantages described in Table 1.

MARLON® A 360 (a surfactant available from CONTENSIO CHEMICALS GmbH, D-45764 Marl, Germany) was heated, with stirring, to 133° C. in a 40 l reactor, and stirred at this temperature for 20 minutes.

At the end of the holding period; the reactor pressure was increased to 28 bar using nitrogen, and the contents were discharged via a nozzle into a low-pressure chamber.

The desired bulk densities were established here by varying the amount of blowing agent to the following extent:

Example 4: 6.45 parts

Example 5: 6.05 parts

Example 6: 5.34 parts

Example 7: 5.06 parts

The results of the DSC measurement and the properties of the molded articles are presented in Table 1.

TABLE 1

| Example | Low-temperature peak (LT) (%) (J/g) | | High-temperature peak (HT) (%) (J/g) | | LT/HT (–) | Bulk density (g/l) | Factor[a] | Properties of molding | | | |
|---|---|---|---|---|---|---|---|---|---|---|---|
| | | | | | | | | Heat resistance | Shrinkage | Surface | Fusion |
| 1[b] | 85.3 | 80.3 | 14.7 | 14.0 | 5.80 | 19 | 110 | 0 | – | 0 | + |
| 2[b] | 75.6 | 73.3 | 24.4 | 23.7 | 3.10 | 38 | 118 | 0/– | 0 | 0 | + |
| 3[b] | 79.9 | 72.8 | 20.1 | 18.4 | 3.98 | 55 | 219 | – | 0 | 0 | + |
| 4 | 72.2 | 72.2 | 27.8 | 27.8 | 2.60 | 21 | 55 | + | + | + | + |
| 5 | 66.1 | 63.4 | 33.9 | 32.5 | 1.95 | 27 | 53 | + | + | + | + |
| 6 | 62.8 | 60.3 | 37.2 | 35.6 | 1.69 | 35 | 59 | + | + | + | + |
| 7 | 53.7 | 55.4 | 46.3 | 47.8 | 1.16 | 77 | 89 | + | + | + | + |

Footnote to Table 1

[a] Factor = $\frac{\text{Area of the low-temperature peak}}{\text{Area of the high-temperature peak}} \times \text{bulk density (g/l)}$

[b] Comparative Examples

Examples 4–7

A suspension consisting of 100 parts of water, 15 parts of random copolymer of ethylene and propylene, blowing agent n-butane as stated below, 0.3 parts of MARLOWET® R 40 (a surfactant available from CONTENSIO CHEMICALS GmbH, D-45764 Marl, Germany) and 0.1 parts of

Examples 8–13

Examples 8–13 were performed in accordance with the procedure of Examples 4–7 to show how it is possible to change the ratio of areas of low temperature peak and high-temperature peak by selecting a suitable impregnation temperature.

TABLE 2

| Example | Impregnation temperature | Low-temperature peak (%) | LT/HT (–) | Properties of the moldings | | | |
|---|---|---|---|---|---|---|---|
| | | | | Heat resistance | shrinkage | Surface | Fusion |
| 8[a] | 149.0 | 82.0 | 4.56 | – | – | – | + |
| 9[a] | 145.0 | 76.4 | 3.24 | 0 | 0 | 0 | + |
| 10 | 140.0 | 713 | 2.48 | + | 0 | 0 | + |
| 11 | 135.0 | 64.1 | 1.79 | + | + | + | + |

TABLE 2-continued

|         |               | Low-        |          | Properties of the moldings | | | |
|---------|---------------|-------------|----------|------------|-----------|---------|--------|
|         | Impregnation  | temperature |          | Heat       |           |         |        |
| Example | temperature   | peak (%)    | LT/HT (−) | resistance | shrinkage | Surface | Fusion |
| 12      | 130.0         | 62.0        | 1.63     | +          | +         | +       | +      |
| 13      | 125.0         | 61.2        | 1.58     | +          | +         | +       | +      | a)Comparative Examples

Obviously, numerous modifications and variations of the present invention are possible in light of the above teachings. It is therefore to be understood that within the scope of the appended claims, the invention may be practiced otherwise than as specifically described herein.

We claim:

1. A polyolefinic foam bead comprising a polyolefin wherein the ratio of the areas of low temperature peak and high-temperature peak in the DSC curve during the first heating has a value of not more than 3, and wherein the heat of fusion of the secondary crystals is greater than 10 J/g.

2. The polyolefinic foam bead of claim 1, wherein the polyolefin is a homo- or copolymer of propene.

3. The polyolefinic foam bead of claim 1, wherein the polyolefin is a random copolymer of ethene and propene having from 1 to 15% by weight of ethene.

4. The polyolefinic foam bead of claim 1, wherein the heat of fusion of the secondary crystals is greater than 15 J/g.

5. The polyolefinic foam bead of claim 1, wherein the following relationship is fulfilled:

$$\frac{\text{Area of the low-temperature peak}}{\text{Area of the high-temperature peak}} \times \text{bulk density (g/l)} \leq 100.$$

6. A molded article formed by molding the polyolefinic foam bead of claim 1.

7. The molded article of claim 6, wherein the polyolefin is a homo- or a copolymer of propene.

8. The molded article of claim 6, wherein the polyolefin is a random copolymer of ethene and propene having from 1 to 15% by weight of ethene.

9. The molded article of claim 6, wherein the heat of fusion of the secondary crystals is greater than 15 J/g.

10. The molded article of claim 6, wherein the following relationship is fulfilled:

$$\frac{\text{Area of the low-temperature peak}}{\text{Area of the high-temperature peak}} \times \text{bulk density (g/l)} \leq 100.$$

11. The polyolefinic foam bead of claim 1, wherein the ratio of the low-temperature peak and high-temperature peak areas is not more than 2.7.

12. The polyolefinic foam bead of claim 11, wherein said ratio is not more than 2.5.

13. The polyolefinic foam bead of claim 4, wherein said heat of fusion of the secondary crystals is greater than 20 J/g.

14. The molded article of claim 6, wherein the ratio of low-temperature peak and high-temperature peak areas is not more than about 2.7.

15. The molded article of claim 14, wherein said ratio of areas is not more than 2.5.

16. The molded article of claim 6, wherein said heat of fusion of the secondary crystals is greater than 20 J/g.

17. The polyolefinic foam bead of claim 1, wherein said polyolefin is a homopolymer of ethene, propene or 1-butene, a random copolymer of propene and ethene or propene and 1-butene, a random copolymer of ethene, propene and 1-butene, a block copolymer of ethene and propene or a copolymer of ethene and vinyl acetate or of ethene and methyl methacrylate.

18. The molded article of claim 6, wherein said polyolefin is a homopolymer of ethene, propene or 1-butene, a random copolymer of propene and ethene or propene and 1-butene, a random copolymer of ethene, propene and 1-butene, a block copolymer of ethene and propene or a copolymer of ethene and vinyl acetate or of ethene and methyl methacrylate.

* * * * *

(12) EX PARTE REEXAMINATION CERTIFICATE (5066th)
United States Patent
Wirobski et al.

(10) Number: US 6,013,687 C1
(45) Certificate Issued: Feb. 22, 2005

(54) PRE-EXPANDED POLYOLEFIN FOAM BEADS

(75) Inventors: Reinhard Wirobski, Marl (DE); Michael Traeger, Haltern (DE); Bernd Guenzel, Haltern (DE)

(73) Assignee: Huels Aktiengesellschaft, Marl (DE)

Reexamination Request:
No. 90/006,449, Nov. 13, 2002

Reexamination Certificate for:
Patent No.: 6,013,687
Issued: Jan. 11, 2000
Appl. No.: 09/145,610
Filed: Sep. 2, 1998

(30) Foreign Application Priority Data

Sep. 6, 1997 (DE) .......................................... 197 39 113

(51) Int. Cl.$^7$ ................................................. C08J 9/32
(52) U.S. Cl. ............................ 521/60; 521/56; 521/58; 521/59; 264/6; 264/126
(58) Field of Search ........................... 521/56, 58, 59, 521/60; 264/6, 126

(56) References Cited

U.S. PATENT DOCUMENTS 5,599,850 A * 2/1997 Park et al. .................... 521/60

FOREIGN PATENT DOCUMENTS

JP 08-20662 * 1/1996

* cited by examiner

*Primary Examiner*—Nathan M. Nutter

(57) ABSTRACT

Polyolefinic foam beads which can be processed over a wide temperature range to give molded articles where a ratio of the areas of low-temperature peak and high-temperature peak in the DSC curve during the first heating has a value of not more than 3, and where the heat of fusion of the secondary crystals is greater than 10 J/g.

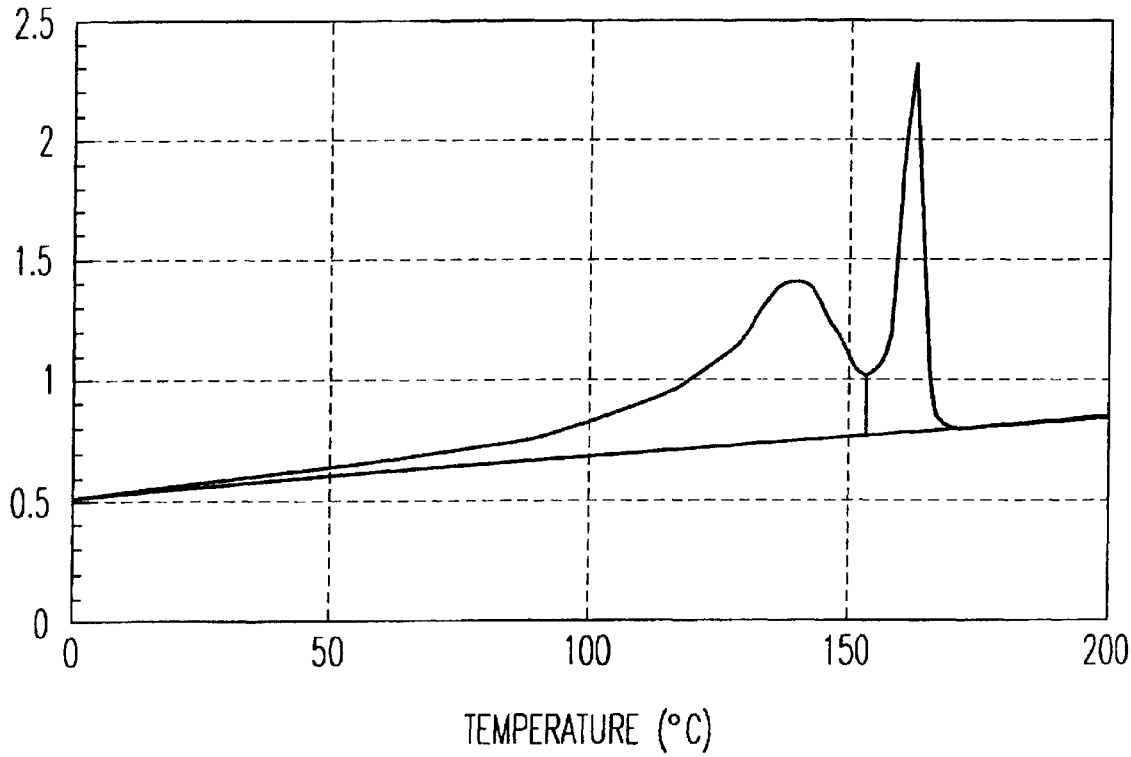

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–18 are cancelled.

* * * * *